United States Patent
Park et al.

(10) Patent No.: US 10,024,393 B2
(45) Date of Patent: Jul. 17, 2018

(54) INPUT SYNTHESIS APPARATUS

(71) Applicant: HYCORE CO., LTD., Seoul (KR)

(72) Inventors: Dong Hyun Park, Gwangmyeong-si (KR); Ho Yul Lee, Seoul (KR)

(73) Assignee: HYCORE CO., LTD., Seoul (KR)

( * ) Notice: Subject to any disclaimer, the term of this patent is extended or adjusted under 35 U.S.C. 154(b) by 0 days.

(21) Appl. No.: 15/303,426

(22) PCT Filed: Apr. 8, 2015

(86) PCT No.: PCT/KR2015/003518
§ 371 (c)(1),
(2) Date: Oct. 11, 2016

(87) PCT Pub. No.: WO2015/156598
PCT Pub. Date: Oct. 15, 2015

(65) Prior Publication Data
US 2017/0037947 A1  Feb. 9, 2017

(30) Foreign Application Priority Data

Apr. 10, 2014  (KR) .................. 10-2014-0042896

(51) Int. Cl.
*F16H 3/00* (2006.01)
*F16H 3/72* (2006.01)

(52) U.S. Cl.
CPC ............ *F16H 3/005* (2013.01); *F16H 3/724* (2013.01); *F16H 3/003* (2013.01)

(58) Field of Classification Search
None
See application file for complete search history.

(56) References Cited

U.S. PATENT DOCUMENTS

| 4,669,578 | A | * | 6/1987 | Fukamachi | F16K 31/043 |
| | | | | | 185/40 R |
| 8,534,408 | B2 | * | 9/2013 | Kajihara | B62M 7/12 |
| | | | | | 180/205.1 |
| 9,657,822 | B2 | * | 5/2017 | Park | B60W 10/04 |
| 2013/0184112 | A1 | * | 7/2013 | Choi | F16H 37/065 |
| | | | | | 475/5 |

FOREIGN PATENT DOCUMENTS

| JP | 2010-041747 A | 2/2010 |
| KR | 10-2012-0028234 A | 3/2012 |
| KR | 10-1173679 B1 | 8/2012 |
| KR | 10-2013-0089624 A | 8/2013 |
| KR | 10-2014-0022333 A | 2/2014 |

* cited by examiner

*Primary Examiner* — Dirk Wright
(74) *Attorney, Agent, or Firm* — Novick, Kim & Lee, PLLC; Jae Youn Kim

(57) ABSTRACT

An input synthesis apparatus according to the present invention includes: a first input unit which provides first rotational force; a second input unit which provides second rotational force equal to or different from the first rotational force; a gear unit which is engaged with the first input unit and the second input unit and synthesizes the first rotational force and the second rotational force; and an output unit which outputs resultant force of the first rotational force and the second rotational force, in which the gear unit sums up speeds or torque of the first rotational force and the second rotational force based on whether a rotation direction of the first input unit and a rotation direction of the second input unit are identical to each other.

11 Claims, 13 Drawing Sheets

INPUT SYNTHESIS APPARATUS

TECHNICAL FIELD

The present invention relates to an input synthesis apparatus, and more particularly, to an input synthesis apparatus capable of creating an output by selectively summing up and synthesizing torque or speeds of inputs.

BACKGROUND ART

In general robot, a power source such as a motor or an engine is used to control a vehicle, a transporting apparatus, or a machine system, and in this case, a capacity of the power source, which satisfies required work (operation, activation), needs to be selected to perform the required work. For example, in a case in which the power source is the motor, a capacity of the motor is closely associated with a size, a weight, and costs of the motor.

In a case in which the robot or the machine system needs to be operated with high torque and at a high speed, a power source having a large capacity is required, which causes an increase in size, weight, and costs of the robot or the machine system.

In the case of the automobile, a gear transmission system, which changes a gear ratio during a process of transmitting rotational force of an engine to wheels, is used to obtain both a high-torque output for allowing the automobile to smoothly travel up a slope and a high-speed output for allowing the automobile to travel at a high speed. However, the gear transmission system is difficult to be used for a small-sized driving system because of a problem of complexity of a mechanical configuration, a price, and a weight thereof.

Meanwhile, the applicant has proposed Korean Patent Application Laid-Open No. 10-2012-0028234 that discloses a planetary gear system using two input properties. However, the applicant has merely proposed a technology for synthesizing input speeds as disclosed in the Korean Patent Application. Therefore, there is a need for an input synthesis apparatus capable of synthesizing torque of inputs as well as the speeds of the inputs in order to create outputs having more various properties.

Therefore, the present invention provides an input synthesis apparatus capable of being simply applied to a small-sized driving system and creating various outputs by selectively synthesizing a speed and torque of the input.

DISCLOSURE

Technical Problem

The present invention has been made in an effort to solve the aforementioned problems, and to provide an input synthesis apparatus capable of creating various outputs by synthesizing a plurality of inputs having different or the same properties.

The present invention provides an input synthesis apparatus capable of creating various outputs by selectively synthesizing torque and speeds of inputs.

The present invention provides an input synthesis apparatus capable of synthesizing speeds or torque of inputs by changing rotation directions of the inputs during an operation of a driving source for creating the inputs.

Technical Solution

In order to solve the aforementioned problems, the present invention provides an input synthesis apparatus including: a first input unit which provides first rotational force; a second input unit which provides second rotational force equal to or different from the first rotational force; a gear unit which is engaged with the first input unit and the second input unit and synthesizes the first rotational force and the second rotational force; and an output unit which outputs resultant force of the first rotational force and the second rotational force, in which the gear unit sums up speeds or torque of the first rotational force and the second rotational force based on whether a rotation direction of the first input unit and a rotation direction of the second input unit are identical to each other.

Gears, which are engaged with the gear unit, may be formed on the first input unit and the second input unit, respectively, and the number of gears formed on the first input unit and the number of gears formed on the second input unit may be different from each other.

Two gears, which are engaged with the gear unit, may be formed on one of the first input unit and the second input unit, and a first one-way bearing and a second one-way bearing may be formed in the two gears.

A power transmission blocking direction of the first one-way bearing and a power transmission blocking direction of the second one-way bearing may be opposite to each other.

The gear unit may include a third one-way bearing formed on a stationary shaft that does not rotate.

A power transmission blocking direction of the third one-way bearing may be identical to a power transmission blocking direction of one of the first one-way bearing and the second one-way bearing.

A gear, which is formed with one of the first one-way bearing and the second one-way bearing which has the same power transmission blocking direction as the third one-way bearing, may be engaged with a planetary gear unit or a differential gear unit of the gear unit.

A gear, which is formed with one of the first one-way bearing and the second one-way bearing which is different in power transmission blocking direction from the third one-way bearing, may be engaged with a gear formed with the third one-way bearing.

The gear unit may include a first input gear which is formed on the first input unit, and a second input gear and a third input gear which are formed on the second input unit, and the planetary gear unit or the differential gear unit may be formed to be engaged with the first input gear, and engaged with the second input gear or the third input gear.

The first one-way bearing and the second one-way bearing may be formed in the second input gear and the third input gear, respectively.

The planetary gear unit may include: a first intermediate gear which is engaged with the first input gear; planet gears which are formed on the first intermediate gear and revolve in a rotation direction of the first intermediate gear; a sun gear which is formed between the planet gears and rotates in a direction opposite to a rotation direction of the planet gears; a ring gear which is engaged with the planet gears and rotates in a direction identical to the rotation direction of the planet gears; a second intermediate gear which has the ring gear formed therein, rotates in the same direction as the ring gear, and is connected to the output unit; and a third intermediate gear which is connected with the sun gear through the same rotating shaft, the third intermediate gear may be engaged with the second input gear, and the second intermediate gear may be engaged with the third input gear.

The differential gear unit may include: a first intermediate gear which is engaged with the first input gear; a first bevel gear which is formed on a planar portion of the first intermediate gear; idle gears which are engaged with the first bevel gear; a second intermediate gear to which a rotating shaft on which the idle gears are rotatably formed is connected and which rotates in a direction identical to a revolution direction of the idle gears; a second bevel gear which is engaged with the idle gears and formed to face the first bevel gear; and a third intermediate gear which has a planar portion on which the second bevel gear is formed, the output unit is connected to the rotating shaft on which the idle gears are formed, the third intermediate gear may be engaged with the second input gear, and the second intermediate gear may be engaged with the third input gear.

A fourth intermediate gear may be formed to be engaged between the second intermediate gear and the third input gear.

The third one-way bearing may be formed in the third intermediate gear.

Advantageous Effects

As described above, the input synthesis apparatus according to the present invention outputs resultant force of inputs having the same or different properties and selectively synthesizes torque and speeds of the inputs, thereby creating various outputs.

The input synthesis apparatus according to the present invention may selectively synthesize torque or speeds of the inputs, and as a result, it is possible to provide outputs having various speeds or torque as necessary, and thus to obtain an effect of changing a gear ratio.

The input synthesis apparatus according to the present invention may produce high-speed and low-torque or low-speed and high-torque outputs as necessary by separately synthesizing torque and speeds of the inputs, and as a result, it is possible to freely change output properties even in the case of a small-sized driving system such as a small-sized robot. In addition, the input synthesis apparatus may be effectively adopted to a small-sized system, and may be easily modularized to enable a reduction in costs and mass production.

The input synthesis apparatus according to the present invention may increase a maximum speed and maximum torque in comparison with a size or a weight of a usage power source, and may drive the power source by using various methods in accordance with loads of an output shaft, thereby improving energy efficiency.

BEST MODE

Figure 1:
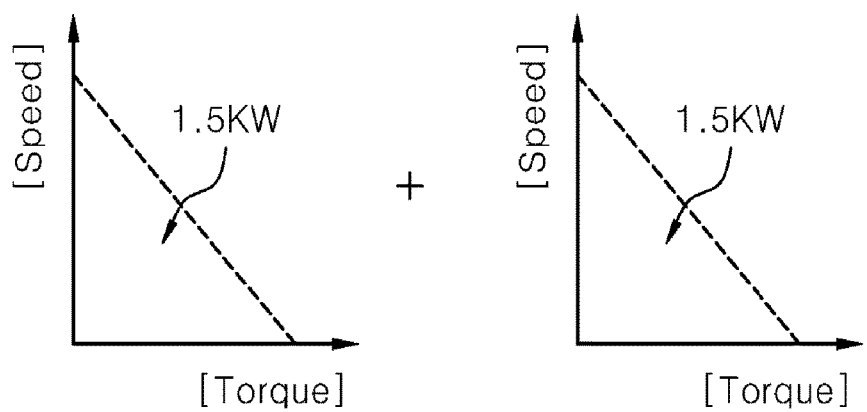
FIGS. 1 and 2 are views for explaining a concept of an input synthesis apparatus according to the present invention.

Hereinafter, exemplary embodiments according to the present invention will be described in detail with reference to the accompanying drawings. However, the present invention is not restricted or limited by the exemplary embodiments. Like reference numerals indicated in the respective drawings refer to the same constituent elements.

Figure 2:
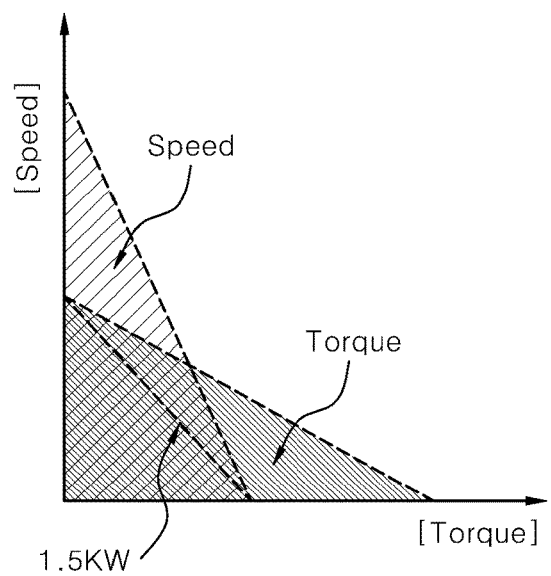
Figure 3:
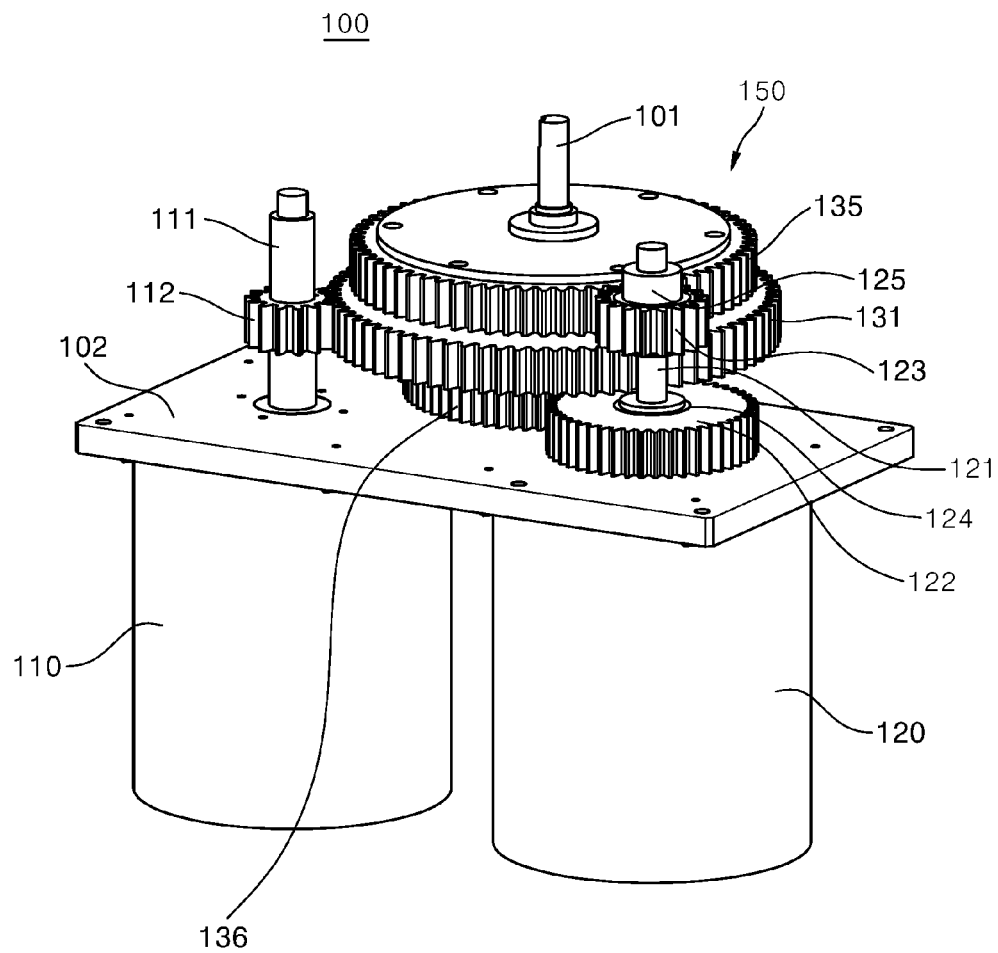
FIG. 3 is a perspective view illustrating an input synthesis apparatus according to one exemplary embodiment of the present invention.
Figure 4:
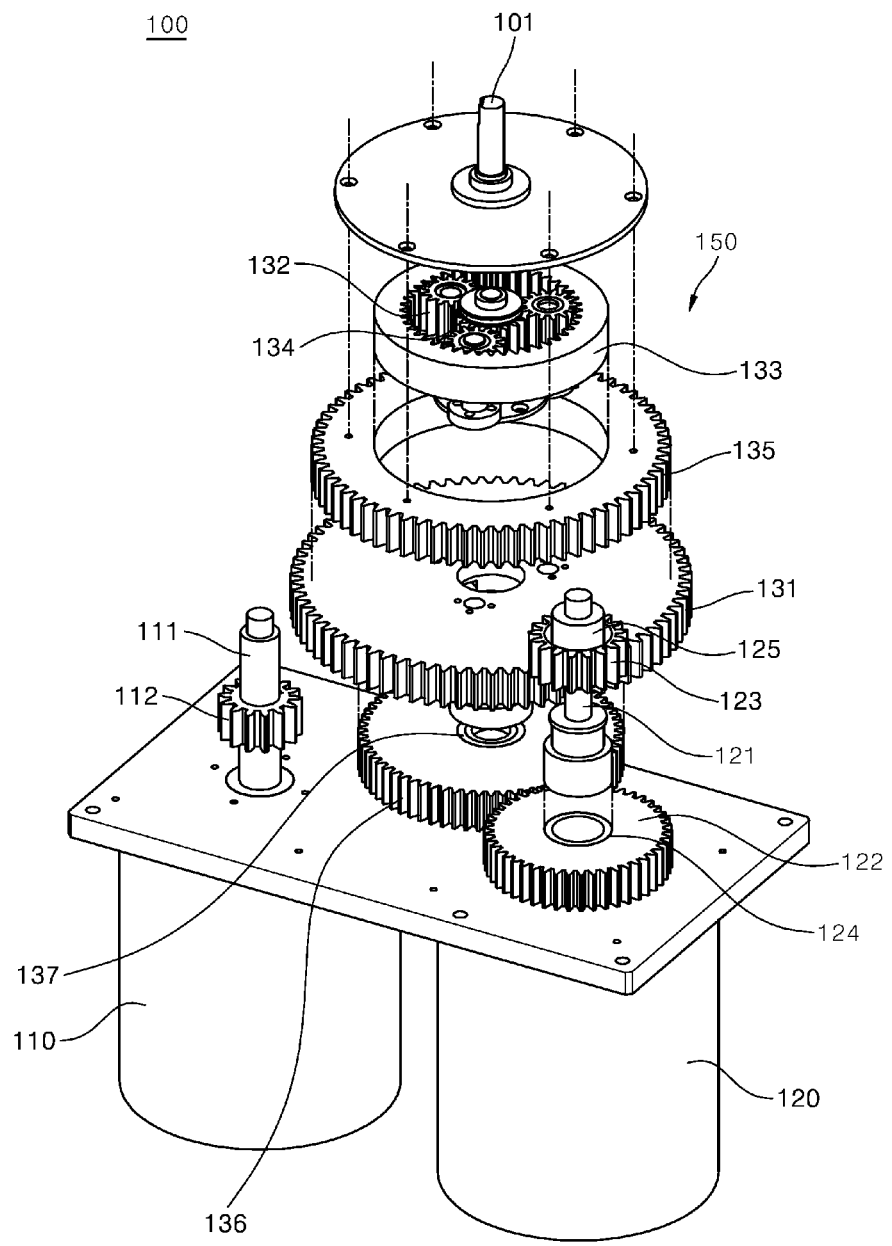
FIG. 4 is an exploded perspective view of the input synthesis apparatus according to FIG. 3.
Figure 7:
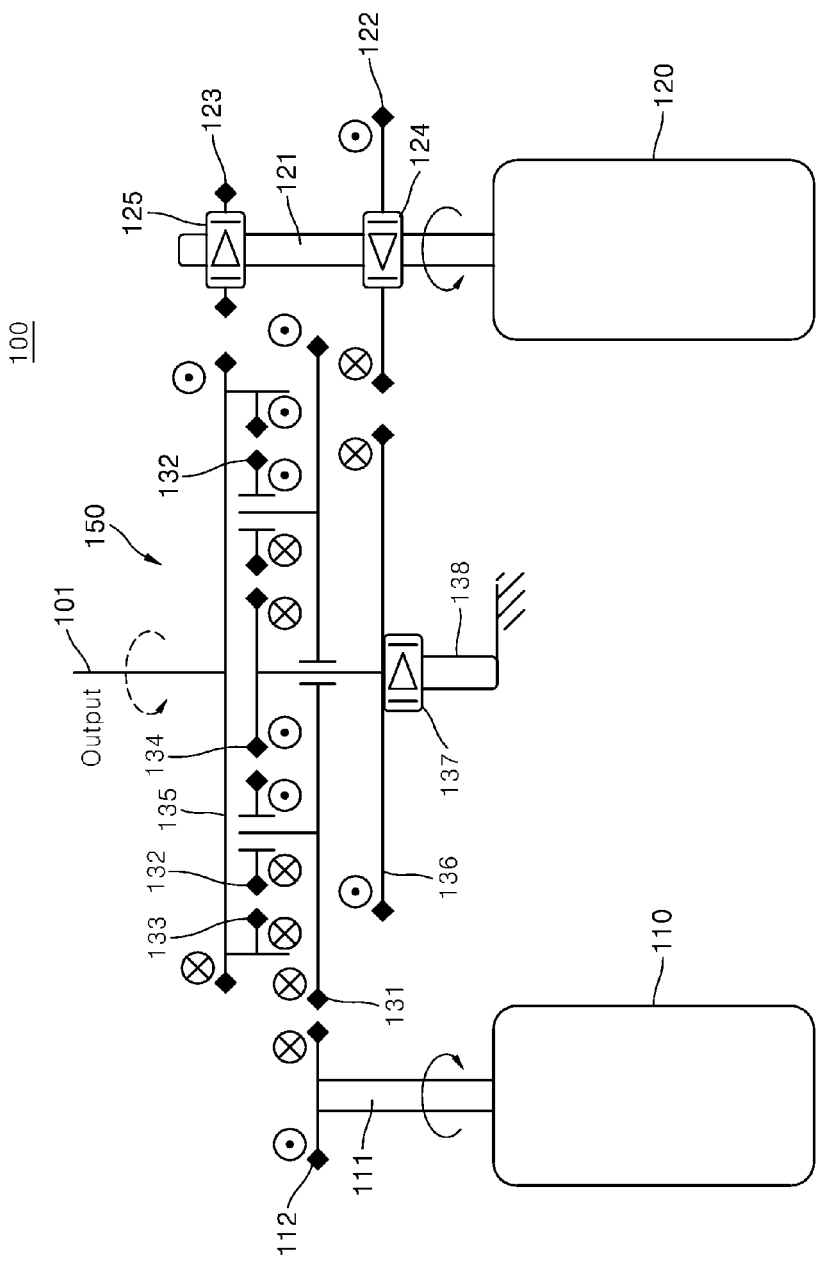
Figure 8:
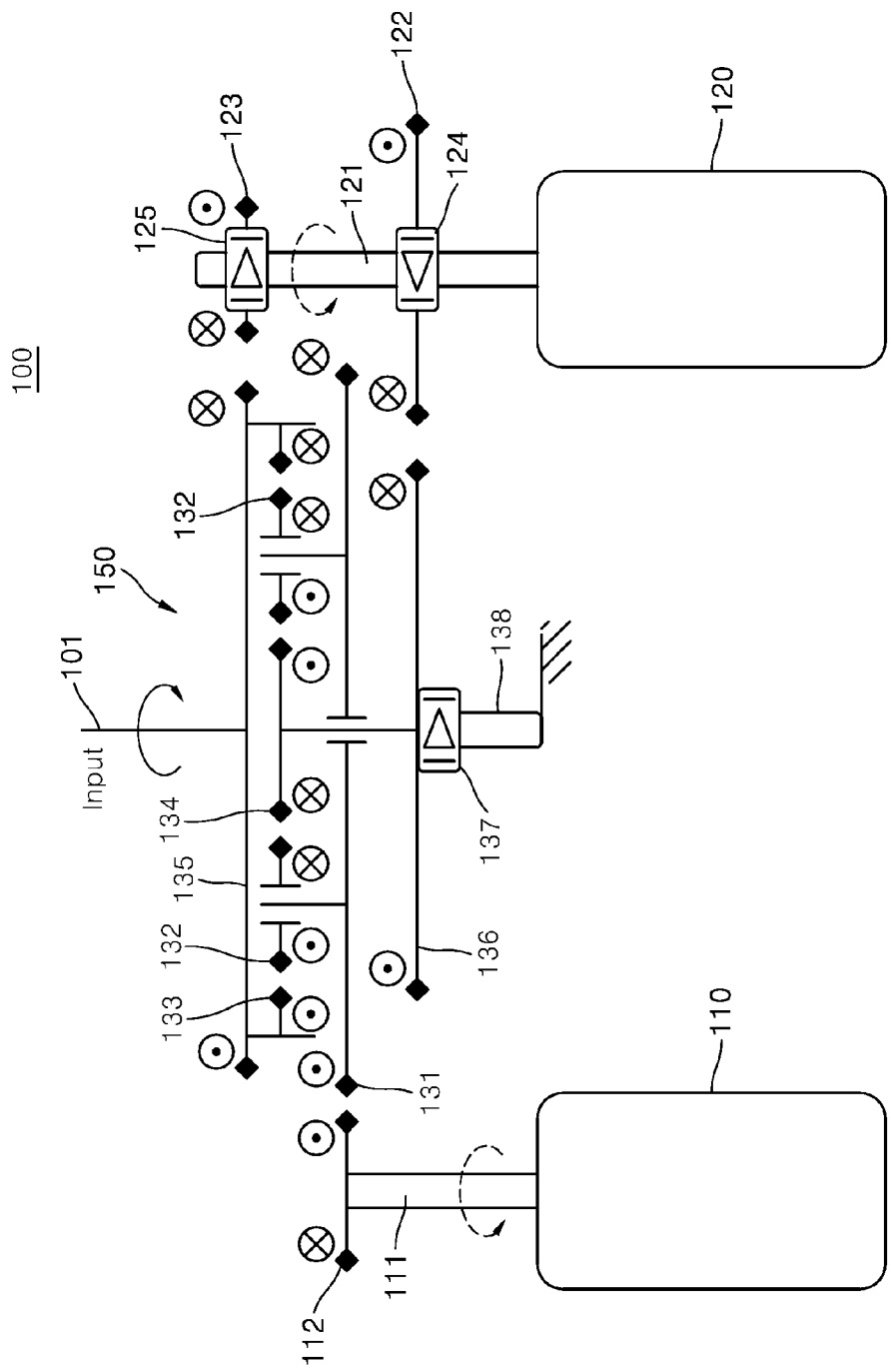
Figure 9:
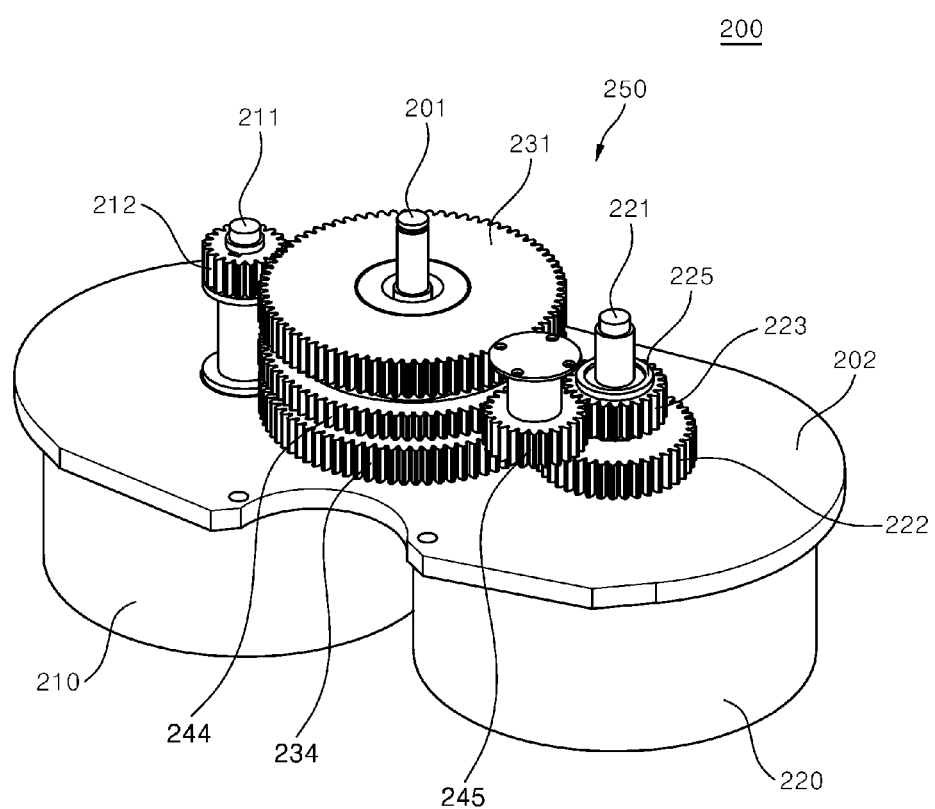
FIG. 9 is a perspective view illustrating an input synthesis apparatus according to another exemplary embodiment of the present invention.
Figure 10:
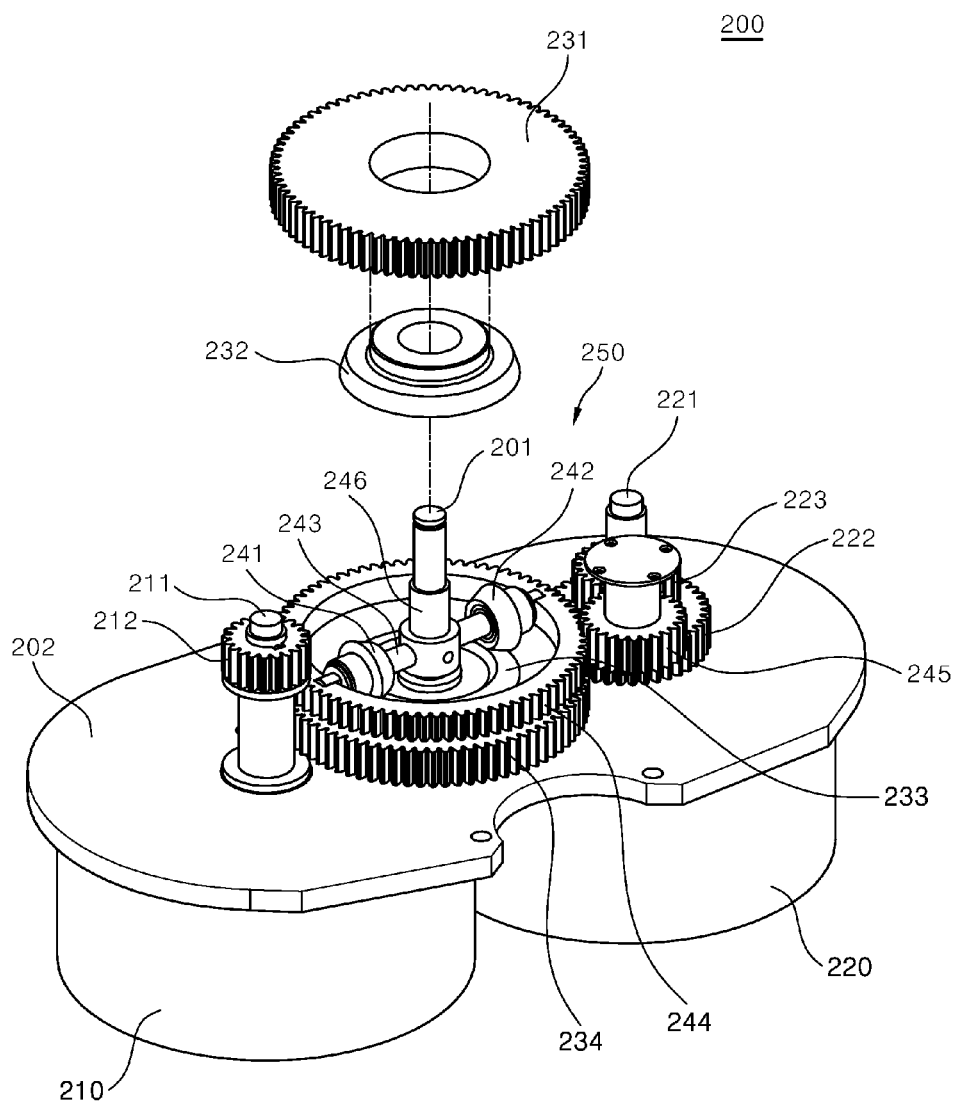
FIGS. 10 and 11 are exploded perspective views of the input synthesis apparatus according to FIG. 9.
Figure 11:
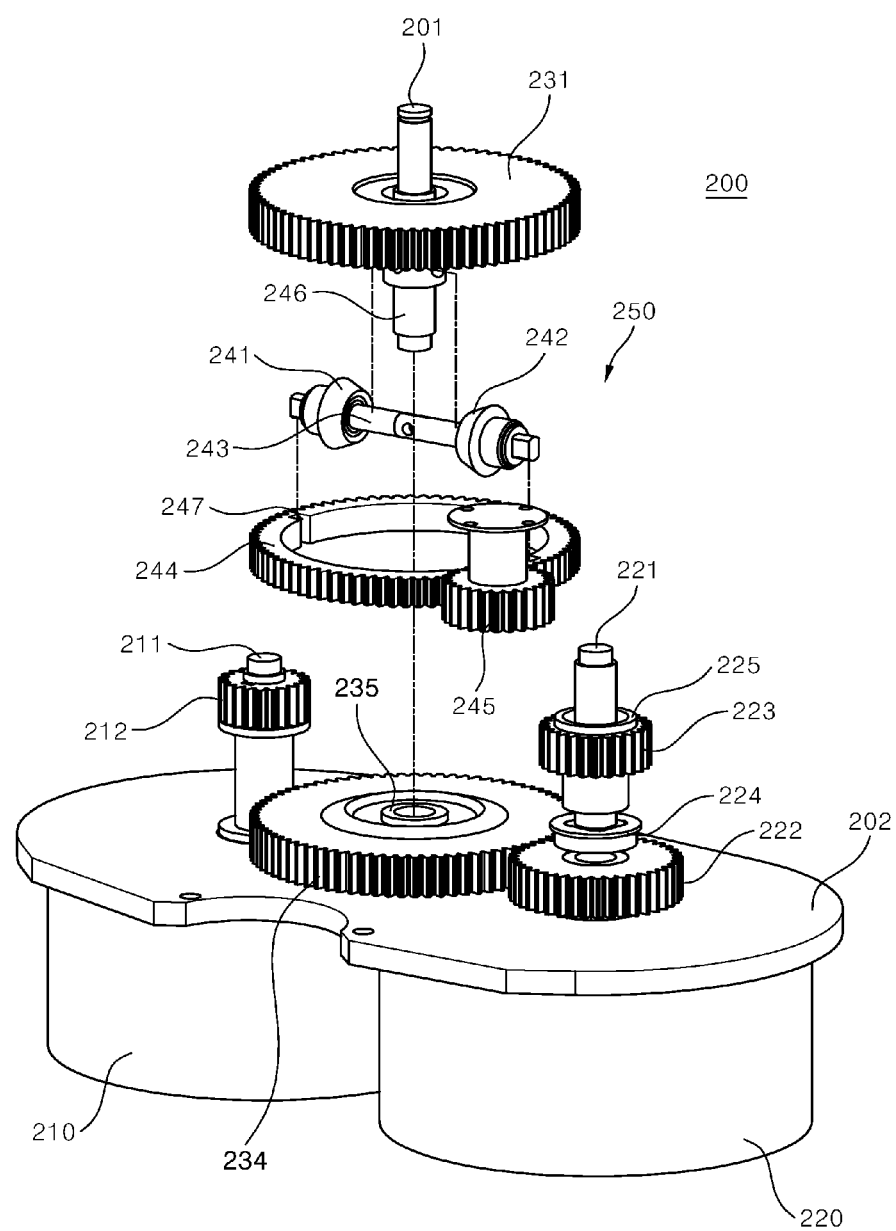

FIGS. 1 and 2 are views for explaining a concept of an input synthesis apparatus according to the present invention, FIG. 3 is a perspective view illustrating an input synthesis apparatus according to one exemplary embodiment of the present invention, FIG. 4 is an exploded perspective view of the input synthesis apparatus according to FIG. 3, FIGS. 5 to 8 are views for explaining a relationship between an input and an output of the input synthesis apparatus according to FIG. 3, FIG. 9 is a perspective view illustrating an input synthesis apparatus according to another exemplary embodiment of the present invention, FIGS. 10 and 11 are exploded perspective views of the input synthesis apparatus according to FIG. 9, and FIGS. 12 to 14 are views for explaining a relationship between an input and an output of the input synthesis apparatus according to FIG. 9.

Referring to FIGS. 1 and 2, input synthesis apparatuses 100 and 200 according to the present invention may synthesize two inputs having the same capacity (or property) as illustrated in FIG. 1, and may synthesize the two inputs by dividing the two inputs into torque and speed. The result of the synthesis is shown in FIG. 2. By synthesizing the inputs by dividing the inputs into the torque and the speed, it is possible to create both a low-speed and high-torque output and a high-speed and low-torque output as illustrated in FIG. 2. The low-speed and high-torque output is an output created by synthesizing torque of two types of inputs, and as for the torque, a maximum value is a value produced by summing up the torque of the two inputs, and as for the speed, an output having a speed equal to a speed of the two inputs may be created. In a case in which a hybrid automobile or the like provided with two driving sources begins to be driven, the torque synthesis may be required. In addition, the torque synthesis is also required when the automobile travels up a slope.

Meanwhile, the high-speed and low-torque output is an output created by synthesizing speeds of two types of inputs, and as for the speed, a maximum value is a value produced by summing up the speeds of the two inputs, and as for the torque, an output having torque equal to the torque of the two inputs. When the hybrid automobile or the like described above exhibits a highest speed, the speed synthesis may be required.

Hereinafter, the input synthesis apparatus, which enables the speed synthesis or the torque synthesis, will be described in more detail.

Referring to FIGS. 3 and 9, the input synthesis apparatus 100 or 200 according to the present invention includes a first input unit 110 or 210 which provides first rotational force; a second input unit 120 or 220 which provides second rotational force equal to or different from the first rotational force; a gear unit 150 or 250 which is engaged with the first input unit 110 or 210 and the second input unit 120 or 220 and synthesizes the first rotational force and the second rotational force; and an output unit 101 or 201 which outputs resultant force of the first rotational force and the second rotational force, in which the gear unit 150 or 250 may sum up the speed or the torque of the first rotational force and the second rotational force in accordance with whether a rotation direction of the first input unit 110 or 210 and a rotation direction of the second input unit 120 or 220 are identical to each other.

With the configuration as described above, the input synthesis apparatus 100 or 200 according to the present invention may synthesize only the speeds of the inputs or may synthesize only the torque of the inputs, and the input synthesis apparatus 100 or 200 may synthesize the torque or the speed during the operations of the first input unit 110 or 210 and the second input unit 120 or 220, thereby producing outputs having various properties.

Meanwhile, the first input unit 110 or 210 and the second input unit 120 or 220 have gears which are engaged with the gear unit 150 or 250, respectively, and the number of gears formed on the first input unit 110 or 210 may be different from the number of gears formed on the second input unit 120 or 220.

Referring to FIGS. 3 and 9, in the input synthesis apparatus 100 or 200 according to the present invention, the first input unit 110 or 210 may have a single gear 112 or 212, and the second input unit 120 or 220 may have two gears 122 and 123, or 222 and 223.

The input synthesis apparatus 100 or 200 according to the present invention includes two input units 110 and 120, or 210 and 220, and as the input unit, various power sources such as an electric motor, a motor, and an engine may be used. The two input units 110 and 120, or 210 and 220 may be fixed to a support plate 102 or 202, and rotational force of the first and second input units 110 and 120, or 210 and 220 may be transmitted through power shafts 111 and 121, or 211 and 221, respectively.

The first input gear 112 or 212 may be formed on the power shaft 111 or 211 of the first input unit 110 or 210, and the second input gear 122 or 222 and the third input gear 123 or 223 may be formed on the power shaft 121 or 221 of the second input unit 120 or 220. That is, different numbers of gears may be mounted or formed on the two input units. In the case of the input synthesis apparatus 100 or 200 according to the present invention, a single gear is formed on the first input unit 110 or 210, and two gears are formed on the second input unit 120 or 220.

The first to third input gears 112, 122, and 123, or 212, 222, and 223 are engaged with the gear unit 150 or 250 and may synthesize the speed or the torque of the inputs. Here, the gear unit 150 or 250 may include first to third input gears 112, 122, and 123, or 212, 222, and 223. Hereinafter, a description will be made to an example in which the first to third input gears 112, 122, and 123, or 212, 222, and 223 are included in the gear unit 150 or 250.

As described above, the two gears 122 and 123, or 222 and 223, which are engaged with the gear unit, may be formed on at least one of the first input unit 110 or 210 and the second input unit 120 or 220, and a first one-way bearing 124 or 224 and a second one-way bearing 125 or 225 may be formed in the two gears 122 and 123, or 222 and 223, respectively. That is, the first one-way bearing 124 or 224 and the second one-way bearing 125 or 225 may be formed in the second input gear 122 or 222 and the third input gear 123 or 223 mounted on the power shaft 121 or 221 of the second input unit 120 or 220, respectively.

Figure 5:
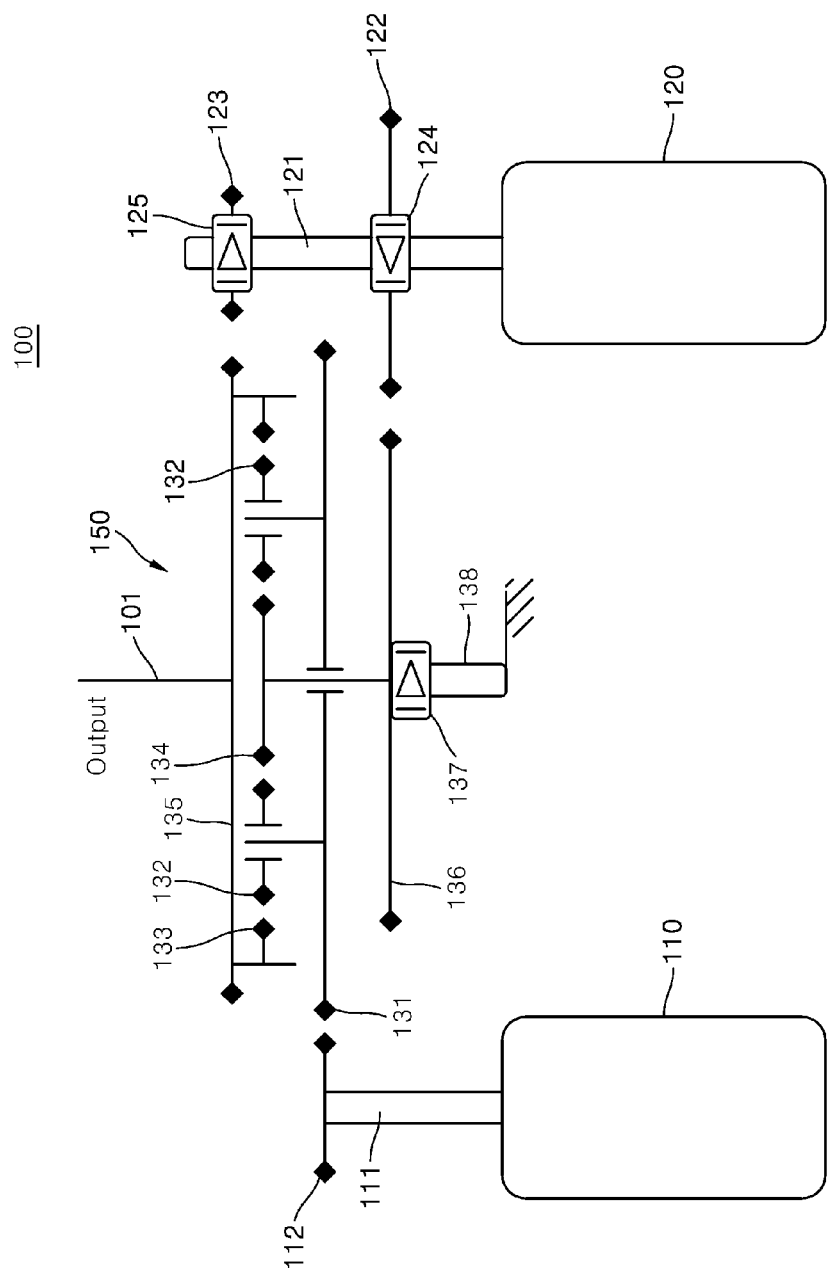
FIGS. 5 to 8 are views for explaining a relationship between an input and an output of the input synthesis apparatus according to FIG. 3.
Figure 12:
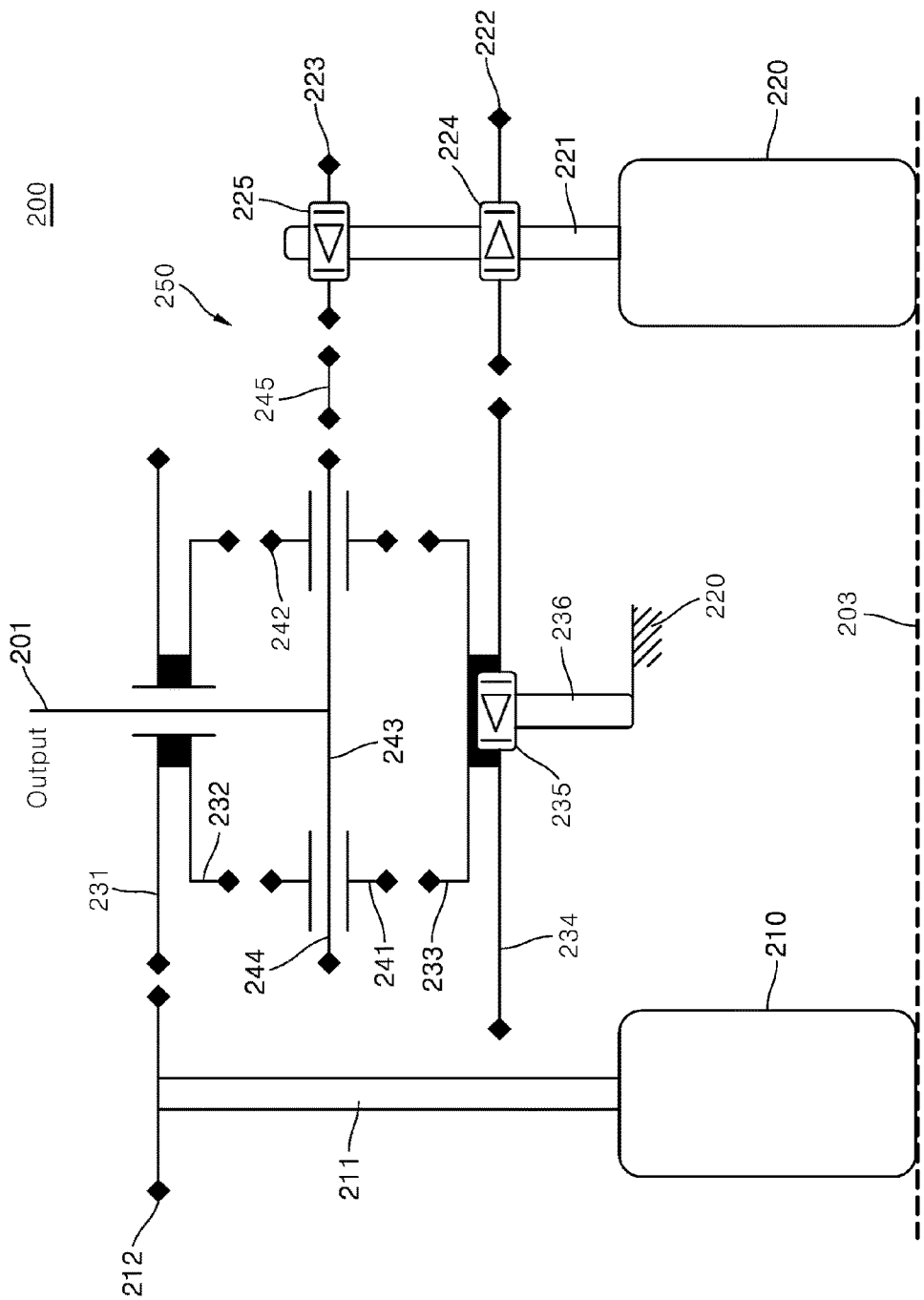
FIGS. 12 to 14 are views for explaining a relationship between an input and an output of the input synthesis apparatus according to FIG. 9.

The one-way bearing is also called a clutch bearing, and the one-way bearing is a member that transmits rotational force and power in any one direction, but does not transmit power in the other direction. Referring to FIGS. 5 and 12, rotation directions of the first one-way bearing 124 or 224 and the second one-way bearing 125 or 225 are illustrated.

A power transmission blocking direction of the first one-way bearing 124 or 224 and a power transmission blocking direction of the second one-way bearing 125 or 225 may be opposite to each other.

Meanwhile, the gear unit 150 or 250 may include a third one-way bearing 137 or 235 which is formed on a stationary shaft 138 or 236 that does not rotate. The third one-way bearing 137 or 235 may control a direction in which the gears of the gear unit 150 or 250 in which the third one-way bearing 137 or 235 is installed are rotated.

A power transmission blocking direction of the third one-way bearing 137 or 235 may be identical to the power transmission blocking direction of any one of the first one-way bearing 124 or 224 and the second one-way bearing 125 or 225. Referring to FIGS. 5 and 12, in the input synthesis apparatus 100 or 200 according to the present invention, the power transmission blocking direction of the third one-way bearing 137 or 235 and the power transmission blocking direction of the second one-way bearing 125 or 225 are identical to each other, but different from the power transmission blocking direction of the first one-way bearing 124 or 224.

The gear 123 or 223, which is formed with one of the first one-way bearing 124 or 224 and the second one-way bearing 125 or 225 which has the same power transmission blocking direction as the third one-way bearing 137 or 235, may be formed to be engaged with a planetary gear unit or a differential gear unit of the gear unit 150 or 250. Here, the planetary gear unit or the differential gear unit may be a unit that synthesizes, together with the one-way bearing, the torque or the speed of the inputs.

The gear 122 or 222, which is formed with one (124 or 224) of the first one-way bearing 124 or 224 and the second one-way bearing 125 or 225 which is different in power transmission blocking direction from the third one-way bearing 137 or 235, may be formed to be engaged with a gear 136 or 234 formed with the third one-way bearing 137 or 235.

The gear unit 150 or 250 includes the first input gear 112 or 212 formed on the first input unit 110 or 210, and the second input gear 122 or 222 and the third input gear 123 or 223 formed on the second input unit 120 or 220, and the planetary gear unit or the differential gear unit may be formed to be engaged with the first input gear 112 or 212 and engaged with the second input gear 122 or 222 or the third input gear 123 or 223.

In the input synthesis apparatus 100 according to one exemplary embodiment of the present invention as illustrated in FIGS. 3 to 8, the gear unit 150 includes the planetary gear unit, and in the input synthesis apparatus 200 according to another exemplary embodiment of the present invention as illustrated in FIGS. 9 to 14, the gear unit 250 includes the differential gear unit.

Referring to FIGS. 3 to 8, the planetary gear unit, which is included in the gear unit 150 of the input synthesis apparatus 100 according to one exemplary embodiment of the present invention, may include a first intermediate gear 131 which is engaged with the first input gear 112; planet gears 132 which are formed on the first intermediate gear 131 and revolve in the rotation direction of the first intermediate gear 131, a sun gear 134 which is formed between the planet gears 132 and rotates in a direction opposite to the rotation direction of the planet gear 132; a ring gear 133 which is engaged with the planet gears 132 and rotates in a direction identical to the rotation direction of the planet gears 132; a second intermediate gear 135 which has the ring gear 133 formed therein so as to rotate in the same direction as the ring gear 133 and connects with the output unit 101; and a third intermediate gear 136 which is connected with the sun gear 134 through the same rotating shaft.

Here, the third intermediate gear 136 may be engaged with the second input gear 122, and the second intermediate gear 135 may be engaged with the third input gear 123.

Referring to FIGS. 3 and 4, the ring gear 133 and the second intermediate gear 135 are formed to rotate together. For example, as illustrated in, the second intermediate gear 135 may be coupled to the ring gear 133 in such a manner that the second intermediate gear 135 is fitted with an outer circumferential surface of the ring gear 133. Gear teeth may be formed on an outer circumferential surface of the second intermediate gear 135.

The first intermediate gear 131 is a carrier. Because rotating shafts of the planet gears 132 are fixedly installed on a planar portion of the first intermediate gear 131, the revolution direction of the planet gears 132 is coincident with the rotation direction of the first intermediate gear 131.

An output shaft or the output unit 101 is formed to rotate together with the second intermediate gear 135. To this end, a circular plate (not illustrated) may be fixedly fastened to a planar portion of the second intermediate gear 135, and the output unit 101 may be coupled to a center of the circular plate.

The first one-way bearing 124 may be mounted between the second input gear 122 and the power shaft 121, and the second one-way bearing 125 may be mounted between the third input gear 123 and the power shaft 121. In addition, the third one-way bearing 137 may be mounted between the third intermediate gear 136 and the stationary shaft 138.

Figure 6:
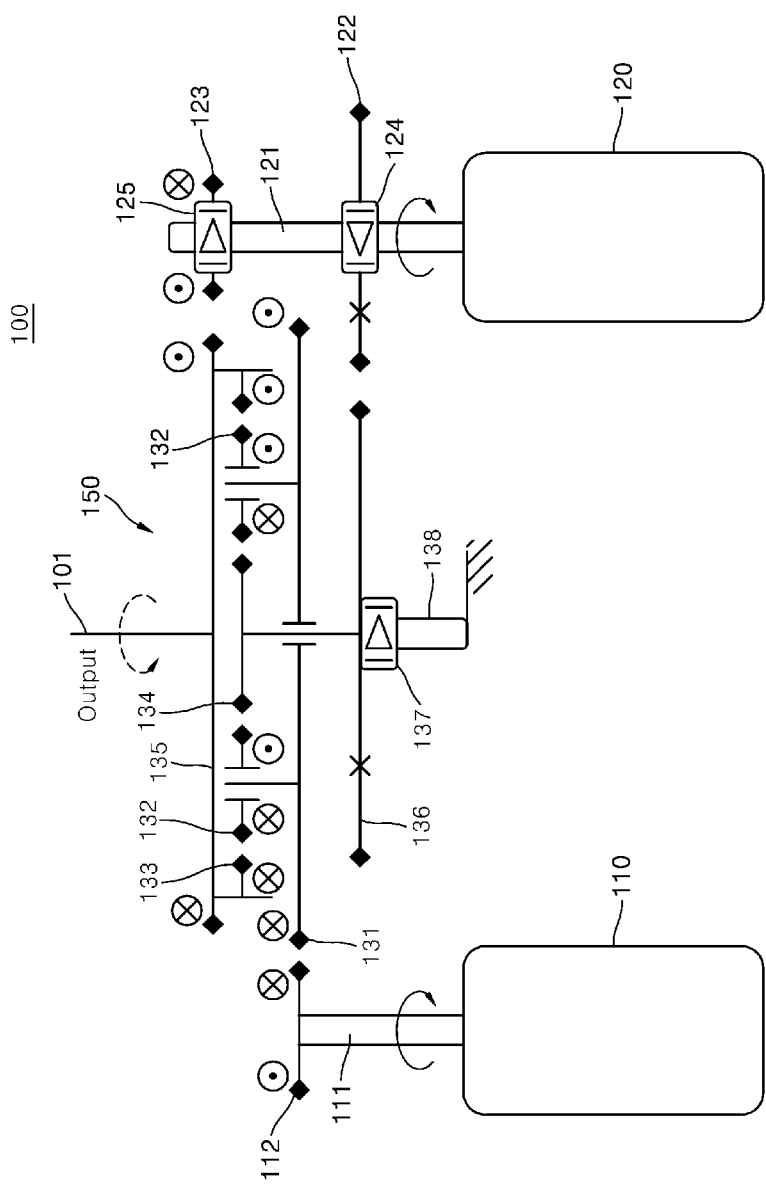

A principle in which the torque and the speed of the inputs are synthesized by the input synthesis apparatus 100 according to one exemplary embodiment of the present invention will be described with reference to FIGS. 6 to 8. In FIGS. 6 to 8, the symbol "⊙" means that the gear protrudes from a plane, and the symbol "X in a circle ○" means that the gear enters the plane. That is, the symbols mean the rotational direction of the gear.

FIG. 6 illustrates a principle of synthesizing the torque of the inputs. That is, FIG. 6 illustrates a power transmission process in a case in which the torque of the first rotational force provided by the first input unit 110 and the torque of the second rotational force provided by the second input unit 120 are synthesized. First, in a case in which the rotation direction of the first rotational force created by the first input unit 110 and the rotation direction of the second rotational force created by the second input unit 120 are identical to each other, the torque may be synthesized (see a solid line arrow in FIG. 6).

As the power shaft 111 of the first input unit 110 rotates, the first input gear 112 rotates, and the first intermediate gear 131 engaged with the first input gear 112 rotates. The first rotational force of the first input unit 110 may be transmitted to the first intermediate gear 131. When the first intermediate gear 131 rotates, the planet gears 132, which are mounted on the planar portion of the first intermediate gear 131, revolve while rotating. With the revolution of the planet gears 132, the ring gear 133 rotates, and in this case, the ring gear 133 rotates in a direction identical to the revolution direction of the planet gears 132. When the ring gear 133 rotates, the second intermediate gear 135 rotates in a direction identical to the rotation direction of the ring gear 133, and the output unit 101 connected to the second intermediate gear 135 also rotates. Through these processes, the first rotational force of the first input unit 110 is transmitted to the output unit 101.

In addition, as the planet gears 132 rotate, the sun gear 134 engaged with the planet gears 132 is about to rotate, and in this case, the sun gear 134 is about to rotate in a direction identical to the rotation direction of the ring gear 133. In this case, the third intermediate gear 136 connected with the sun gear 134 is about to rotated, but the third intermediate gear 136 cannot rotate because of the third one-way bearing 137, and only the ring gear 133 rotates.

Meanwhile, as the power shaft 121 of the second input unit 120 rotates, the second input gear 122 and the third input gear 123 need to rotate, but the second input gear 122 does not rotate because of the first one-way bearing 124, and only the third input gear 123 rotates. The second one-way bearing 125 transmits rotational force or driving power of the second input unit 120 to the third input gear 123.

The third input gear 123 is engaged with the second intermediate gear 135, and the second rotational force is transmitted to the second intermediate gear 135, and transmitted finally to the output unit 101. In a case in which the first input unit 110 and the second input unit 120 rotate in the same direction as described above, that is, in a case in which the rotation directions of the first rotational force and the second rotational force are identical to each other, the first rotational force and the second rotational force are transmitted directly to the second intermediate gear 135 by the planetary gear unit and the one-way bearings, and as a result, the torque of the first rotational force and the second rotational force may be synthesized and created through the output unit 101.

FIG. 7 illustrates a principle of synthesizing the speeds of the inputs. That is, FIG. 7 illustrates a power transmission process in a case in which the speed of the first rotational force provided by the first input unit 110 and the speed of the second rotational force provided by the second input unit 120 are synthesized. First, in a case in which the rotation direction of the first rotational force created by the first input unit 110 and the rotation direction of the second rotational force created by the second input unit 120 are different from each other, the speed may be synthesized (see a solid line arrow in FIG. 7).

The process in which the first rotational force of the first input unit 110 is transmitted finally to the output unit 101 through the second intermediate gear 135 is the same as the process in FIG. 6.

Meanwhile, as the power shaft 121 of the second input unit 120 rotates, the second input gear 122 and the third input gear 123 need to rotate, and the second input gear 122 rotates by the first one-way bearing 124, but the third input gear 123 idles because of the second one-way bearing 125. That is, even though the third input gear 123 rotates, the third input gear 123 does not transmit rotational force to the second intermediate gear 135.

The second input gear 122 is engaged with the third intermediate gear 136 and transmits rotational force to the third intermediate gear 136, and the third intermediate gear 136 transmits rotational force to the sun gear 134 connected with the third intermediate gear 136. In this case, the rotation direction of the rotational force being transmitted to the sun gear 134 by the third intermediate gear 136 and the rotation direction of the rotational force being transmitted to the sun gear 134 by the first input gear 112 are identical to each other. For this reason, a rotational speed of the second intermediate gear 135 is increased, and finally, the speed of the first rotational force and the speed of the second rotational force may be synthesized and created through the output unit 101.

FIG. 8 illustrates a power transmission relationship in a case in which the output unit 101 receives an input. Assuming that the input synthesis apparatus 100 according to one exemplary embodiment of the present invention is connected with a pedal of a bicycle and the output unit 101 is connected with a wheel of the bicycle, a power transmission process when moving the bicycle backward is identical to a process illustrated in FIG. 8.

When the output unit 101 rotates counterclockwise, the second intermediate gear 135 connected with the output unit 101 also rotates in the same direction, and rotational force may be sequentially transmitted to the power shaft 111 of the first input unit 110 and the power shaft 121 of the second input unit 120 by the planetary gear unit. In this process, the power shafts 111 and 121 rotate in the same direction by the operations of the planetary gear unit and the one-way bearings 124, 125, and 137. In this case, the power shafts 111 and 121 idle.

Meanwhile, referring to FIGS. 9 to 14, the differential gear unit included in the gear unit 250 of the input synthesis apparatus 200 according to another exemplary embodiment of the present invention may include a first intermediate gear 231 which is engaged with the first input gear 212; a first bevel gear 232 which is formed on a planar portion of the first intermediate gear 231; idle gears 241 and 242 which are engaged with the first bevel gear 232; a second intermediate gear 244 to which a rotating shaft 243 on which the idle gears 241 and 242 are rotatably formed is connected and which rotates in a direction identical to a revolution direction of the idle gears 241 and 242; a second bevel gear 233 which is engaged with the idle gears 241 and 242 and formed to face the first bevel gear 232; and a third intermediate gear 234 which has a planar portion on which the second bevel gear 233 is formed.

Here, the output unit 201 is connected to the rotating shaft 243 on which the idle gears 241 and 242 are formed, the third intermediate gear 234 is engaged with the second input gear 222, and the fourth intermediate gear 245 may be formed to be engaged between the second intermediate gear 244 and the third input gear 223.

Referring to FIGS. 9 to 11, the first bevel gear 232 and the first intermediate gear 231 may be integrally formed, and the second bevel gear 233 and the third intermediate gear 234 may be integrally formed. The idle gears 241 and 242 and the second intermediate gear 244 are positioned between the first intermediate gear 231 and the third intermediate gear 234.

The idle gears 241 and 242 may revolve around a center of the second intermediate gear 244, and to this end, two idle gears 241 and 242 are rotatably mounted at both ends of the rotating shaft 243. The both ends of the rotating shaft 243 penetrate the idle gears 241 and 242 and protrude, and the protruding both ends are fitted with grooves 247 formed in an inner circumferential surface of the second intermediate gear 244, respectively. For this reason, when the second intermediate gear 244 rotates, the rotating shaft 243 also rotates together with the second intermediate gear 244, and the idle gears 241 and 242 mounted on the rotating shaft 243 revolve in a direction identical to the rotation direction of the second intermediate gear 244.

Meanwhile, since the idle gears 241 and 242 revolve in a state of being engaged with the first and second bevel gears 232 and 233, the idle gears 241 and 242 revolve while rotating. Since the rotating shaft 243 rotates because of the revolution of the idle gears 241 and 242, the output unit 201 connected to the rotating shaft 243 rotates.

The output unit 201 passes through the first intermediate gear 231 and is exposed to the outside, and as a result, rotational force of the first intermediate gear 231 is not transmitted to the output unit 201.

Meanwhile, the third one-way bearing 235 may be formed on the third intermediate gear 234. That is, the third one-way bearing 235 is mounted between the third intermediate gear 234 and the stationary shaft 236. Non-described reference numeral "203" in FIG. 12 is a case.

A principle in which the torque and the speed of the inputs are synthesized by the input synthesis apparatus 200 according to another exemplary embodiment of the present invention will be described with reference to FIGS. 13 and 14.

Figure 13:
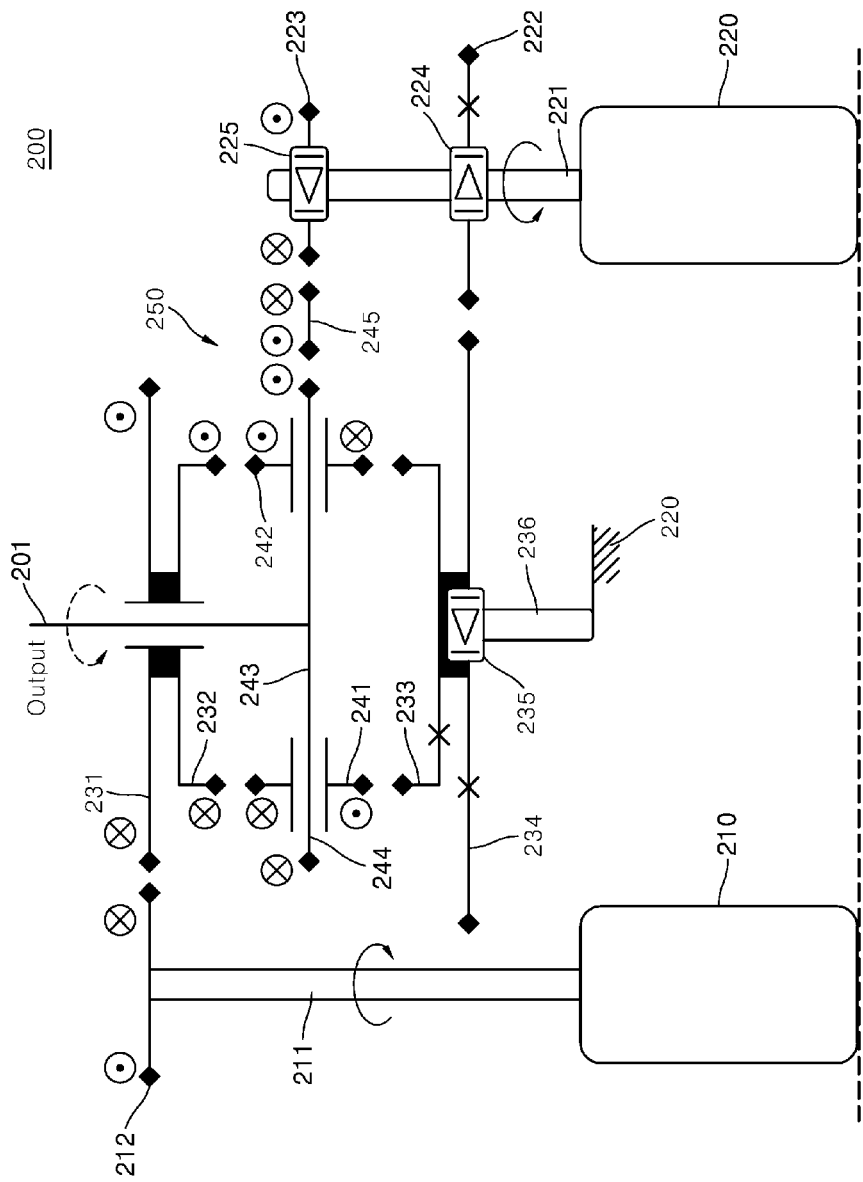

FIG. 13 illustrates a principle of synthesizing the torque of the inputs. That is, FIG. 13 illustrates a power transmission process in a case in which the torque of the first rotational force provided by the first input unit 210 and the torque of the second rotational force provided by the second input unit 220 are synthesized. First, in a case in which the rotation direction of the first rotational force created by the first input unit 210 and the rotation direction of the second rotational force created by the second input unit 220 are different from each other, that is, in a case in which the first input unit 210 rotates clockwise and the second input unit 220 rotates counterclockwise, the torque may be synthesized (see a solid line arrow in FIG. 13). That is, in a case in which the second input unit 220 rotates in a reverse direction, the torque may be synthesized.

When the power shaft 211 of the first input unit 210 rotates clockwise, the first input gear 212 creates the first rotational force while rotating in the same direction. The first rotational force is transmitted to the first intermediate gear 231 engaged with the first input gear 212. When the first intermediate gear 231 rotates, the first bevel gear 232 also rotates in the same direction. With the rotation of the first bevel gear 232, the idle gears 241 and 242 revolve while rotating. Since the idle gears 241 and 242 rotate, the second bevel gear 233 and the third intermediate gear 234, which are engaged with the idle gears 241 and 242, are about to rotate in a direction opposite to the rotation direction of the first bevel gear 232, but the third one-way bearing 235 inhibits the rotation of the third intermediate gear 234, and as a result, the second bevel gear 233 also cannot rotate. In a case in which the speed is synthesized, an output is created because the input unit is operated to inhibit the second bevel gear 233 from rotating in a direction opposite to the rotation direction of the first bevel gear 232, but in a case in which the torque is synthesized, an output is not created at all if the second bevel gear 233 cannot be inhibited from rotating in a direction opposite to the rotation direction of the first bevel gear 232, and the idle gears 241 and 242 merely rotate and revolve. Therefore, in order to create an output even in a case in which the torque is synthesized, the third one-way bearing 235 is required. That is, in a case in which the torque is synthesized, the rotation of the third intermediate gear 234 is inhibited by the third one-way bearing 235, and as a result, the second bevel gear 233 does not also rotate.

Meanwhile, since the idle gears 241 and 242 revolve in the same direction as the first intermediate gear 231, the output unit 201 connected with the rotating shaft 243 also rotates in the same direction (counterclockwise). Through these processes, the first rotational force of the first input unit 210 is transmitted to the output unit 201.

In addition, when the power shaft 221 of the second input unit 220 rotates counterclockwise, the second input gear 222 does not rotate, and only the third input gear 223 rotates in the same counterclockwise. The rotational force of the second input gear 222 is transmitted to the second intermediate gear 244 via the fourth intermediate gear 245. That is, the torque of the second intermediate gear 244, which is created by the first input unit 210, and the torque of the second intermediate gear 244, which is created by the second input unit 220, are summed up. The torque of the second intermediate gear 244, which has been summed up, is transmitted to the output shaft 201 through the rotating shaft 243. The torque of the first input unit 210 and the torque of the second input unit 220 are synthesized in accordance with the aforementioned principle.

Figure 14:
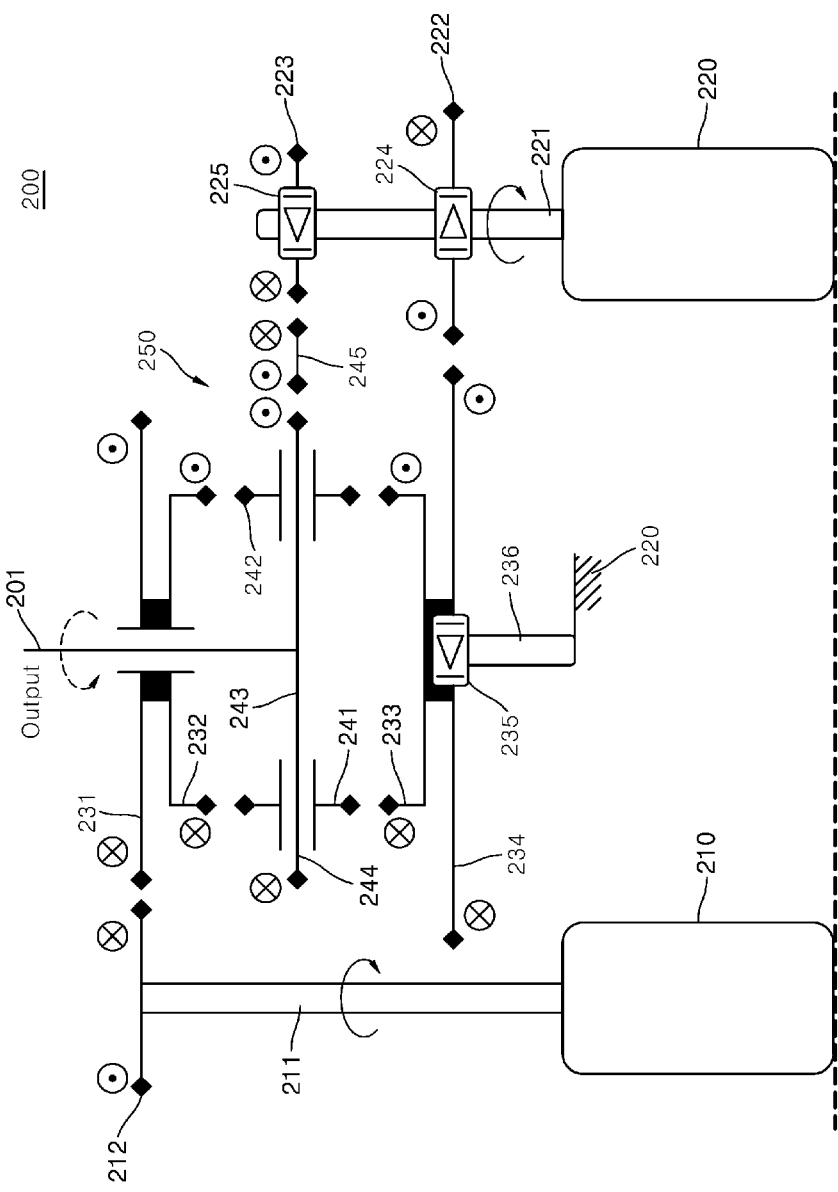

FIG. 14 illustrates a principle of synthesizing the speeds of the inputs. That is, FIG. 14 illustrates a power transmission process in a case in which the speed of the first rotational force provided by the first input unit 210 and the speed of the second rotational force provided by the second input unit 220 are synthesized. First, in a case in which the rotation direction of the first rotational force created by the first input unit 210 and the rotation direction of the second rotational force created by the second input unit 220 are identical to each other (the clockwise direction in FIG. 14), the speed may be synthesized. That is, the speed may be synthesized when the second input unit 220 rotates in a direction (clockwise) identical to the rotation direction of the first input unit 210 (see a solid line arrow in FIG. 14).

The process in which the first rotational force of the first input unit 210 is transmitted finally to the output unit 201 through the second intermediate gear 244 is the same as the process in FIG. 13.

Meanwhile, as the power shaft 221 of the second input unit 220 rotates clockwise, the second input gear 222 and the third input gear 223 need to rotate, and the second input gear 222 rotates by the first one-way bearing 224, but the third input gear 223 idles because of the second one-way bearing 225. That is, even though the third input gear 223 rotates, the third input gear 223 does not transmit rotational force to the second intermediate gear 244.

The second input gear 222 is engaged with the third intermediate gear 234 and transmits rotational force to the third intermediate gear 234, the third intermediate gear 234 allows the idle gears 241 and 242 to idle through the second bevel gear 233, and transmits rotational force to the output unit 201 connected to the rotating shaft 243. In this case, in a case in which the speed of the first bevel gear 232 and the speed of the second bevel gear 233, which have been created by the first input unit 210 and the second input unit 220, are equal to each other, the idle gears 241 and 242 only revolve without rotating. If the rotational speed of the first bevel gear 232 and the rotational speed of the second bevel gear 233 are different from each other, the idle gears 241 and 242 rotate in a particular direction, and revolve in the same direction as the first bevel gear 232 and the second bevel gear 233.

Revolution force of the idle gears 241 and 242 rotates the output shaft 201 through the rotating shaft 243. That is, an idle speed of the idle gears 241 and 242 is a speed of the output shaft 201. In this case, because the idle speed of the idle gears 241 and 242, which is caused by the first input unit 210, and the idle speed of the idle gears 241 and 242, which is caused by the second input unit 220, are summed up, the speed of the first input unit 210 and the speed of the second input unit 220 are summed up.

As described above, in a case in which the speeds are synthesized, the first bevel gear 232 and the second bevel gear 233 rotate always in the same direction. In addition, a direction in which the idle gears 241 and 242 rotate is determined based on a difference in speed between the first bevel gear 232 and the second bevel gear 233.

As described above, in a case in which the three one-way bearings and the planetary gear unit are provided, the input synthesis apparatus 100 according to the present invention synthesizes the torque when the direction of the first rotational force provided by the first input unit and the direction of the second rotational force provided by the second input unit are identical to each other, and synthesizes the speed when the direction of the first rotational force provided by the first input unit and the direction of the second rotational force provided by the second input unit are different from each other, and as a result, it is possible to produce outputs having various speeds and torque.

While the exemplary embodiments of the present invention have been described above with reference to particular contents such as specific constituent elements, the limited exemplary embodiments, and the drawings, but the exemplary embodiments are provided merely for the purpose of helping understand the present invention overall, and the present invention is not limited to the exemplary embodiment, and may be variously modified and altered from the disclosure by those skilled in the art to which the present invention pertains. Therefore, the spirit of the present invention should not be limited to the described exemplary embodiments, and all of the equivalents or equivalent modifications of the claims as well as the appended claims belong to the scope of the spirit of the present invention.

INDUSTRIAL APPLICABILITY

The present invention may be used in the technical field, such as robots, transporting apparatuses, and moving means, where it is necessary to create various outputs by synthesizing a plurality of inputs.

The invention claimed is:
1. An input synthesis apparatus, comprising:
a first input unit which provides first rotational force;
a second input unit which provides second rotational force equal to or different from the first rotational force;
a gear unit which is engaged with the first input unit and the second input unit and synthesizes the first rotational force and the second rotational force; and
an output unit which outputs resultant force of the first rotational force and the second rotational force,
wherein the gear unit sums up speeds or torque of the first rotational force and the second rotational force based on whether a rotation direction of the first input unit and a rotation direction of the second input unit are identical to each other,
wherein two gears, which are engaged with the gear unit, are formed on one of the first input unit and the second input unit, and a first one-way bearing and a second one-way bearing are formed in the two gears,
wherein a power transmission blocking direction of the first one-way bearing and a power transmission blocking direction of the second one-way bearing are opposite to each other, and
wherein the gear unit includes a third one-way bearing formed on a stationary shaft that does not rotate.
2. The input synthesis apparatus of claim 1, wherein gears, which are engaged with the gear unit, are formed on the first input unit and the second input unit, respectively, and the number of gears formed on the first input unit and the number of gears formed on the second input unit are different from each other.

3. The input synthesis apparatus of claim 1, wherein a power transmission blocking direction of the third one-way bearing is identical to a power transmission blocking direction of one of the first one-way bearing and the second one-way bearing.

4. The input synthesis apparatus of claim 3, wherein a gear, which is formed with one of the first one-way bearing and the second one-way bearing which has the same power transmission blocking direction as the third one-way bearing, is engaged with a planetary gear unit or a differential gear unit of the gear unit.

5. The input synthesis apparatus of claim 4, wherein a gear, which is formed with one of the first one-way bearing and the second one-way bearing which is different in power transmission blocking direction from the third one-way bearing, is engaged with a gear formed with the third one-way bearing.

6. The input synthesis apparatus of claim 5, wherein the gear unit includes a first input gear which is formed on the first input unit, and a second input gear and a third input gear which are formed on the second input unit, and the planetary gear unit or the differential gear unit are formed to be engaged with the first input gear, and engaged with the second input gear or the third input gear.

7. The input synthesis apparatus of claim 6, wherein the first one-way bearing and the second one-way bearing are formed in the second input gear and the third input gear, respectively.

8. The input synthesis apparatus of claim 7, wherein the planetary gear unit includes:
a first intermediate gear which is engaged with the first input gear;
planet gears which are formed on the first intermediate gear and revolve in a rotation direction of the first intermediate gear;
a sun gear which is formed between the planet gears and rotates in a direction opposite to a rotation direction of the planet gears;
a ring gear which is engaged with the planet gears and rotates in a direction identical to the rotation direction of the planet gears;
a second intermediate gear which has the ring gear formed therein, rotates in the same direction as the ring gear, and is connected to the output unit; and
a third intermediate gear which is connected with the sun gear through the same rotating shaft,
the third intermediate gear is engaged with the second input gear, and the second intermediate gear is engaged with the third input gear.

9. The input synthesis apparatus of claim 7, wherein the differential gear unit includes:
a first intermediate gear which is engaged with the first input gear;
a first bevel gear which is formed on a planar portion of the first intermediate gear;
idle gears which are engaged with the first bevel gear;
a second intermediate gear to which a rotating shaft on which the idle gears are rotatably formed is connected and which rotates in a direction identical to a revolution direction of the idle gears;
a second bevel gear which is engaged with the idle gears and formed to face the first bevel gear; and
a third intermediate gear which has a planar portion on which the second bevel gear is formed,
the output unit is connected to the rotating shaft on which the idle gears are formed,
the third intermediate gear is engaged with the second input gear, and the second intermediate gear is engaged with the third input gear.

10. The input synthesis apparatus of claim 9, wherein a fourth intermediate gear is engaged between the second intermediate gear and the third input gear.

11. The input synthesis apparatus of claim 8, wherein the third one-way bearing is formed in the third intermediate gear.

* * * * *